(12) United States Patent
Givental et al.

(10) Patent No.: US 9,363,093 B2
(45) Date of Patent: Jun. 7, 2016

(54) UTILIZING EYE TRACKING TO DETERMINE ATTENDEE ENGAGEMENT

(71) Applicant: International Business Machines Corporation, Armonk, NY (US)

(72) Inventors: Gary I. Givental, Bloomfield Hills, MI (US); Kaleb D. Walton, Fenton, MI (US)

(73) Assignee: International Business Machines Corporation, Armonk, NY (US)

( * ) Notice: Subject to any disclaimer, the term of this patent is extended or adjusted under 35 U.S.C. 154(b) by 169 days.

(21) Appl. No.: 14/221,896

(22) Filed: Mar. 21, 2014

(65) Prior Publication Data

US 2015/0270983 A1 Sep. 24, 2015

(51) Int. Cl.
*G06K 9/00* (2006.01)
*H04L 12/18* (2006.01)

(52) U.S. Cl.
CPC .................................. *H04L 12/1831* (2013.01)

(58) Field of Classification Search
CPC ..................... A61B 3/113; A61F 2009/00846; H04L 12/1831
See application file for complete search history.

(56) References Cited

U.S. PATENT DOCUMENTS

2008/0144941 A1* 6/2008 Togashi ............... G06K 9/4619 382/207
2009/0307601 A1 12/2009 Kumhyr et al.
2010/0295706 A1 11/2010 Mathan et al.
2011/0295392 A1* 12/2011 Cunnington ........... G06Q 10/10 700/90
2013/0205314 A1* 8/2013 Ramaswamy ... H04N 21/44213 725/14

FOREIGN PATENT DOCUMENTS

WO 2008010118 A1 1/2008

OTHER PUBLICATIONS

Gatica-Perez et al., "Detecting Group Interest-Level in Meetings", Proceedings (ICASSP '05) IEEE International Conference on Acoustics, Speech, and Signal Processing, 2005, vol. 1, pp. I-489-I-492.
Levialdi et al., "Detecting attention through Telepresence", Presence 2007, Academia.edu, <http://www.academia.edu/2826885/Detecting_attention_through_Telepresence>.
Stiefelhagen et al., "Tracking Focus of Attention in Meetings", 2002, Proceedings of the Fourth IEEE International Conference on Multimodal Interfaces, pp. 273-280.

(Continued)

*Primary Examiner* — Amara Abdi
(74) *Attorney, Agent, or Firm* — David B. Woycechowsky

(57) ABSTRACT

Eye tracking for the purpose of detecting attendee disengagement with respect to a presentation including a visual display communicated over a network. The eye tracking method includes: during a play of the presentation, tracking eye positions of a set of control party(ies); during a play of the presentation, tracking eye positions of a set of non-control party(ies); determining a set of divergence value(s) corresponding to divergence between the eye position(s) of the control party(ies) and the non-control party(ies); and determining a disengagement value corresponding to relative disengagement of the non-control party(ies) based, at least in part on the set of divergence value(s).

3 Claims, 3 Drawing Sheets

(56) References Cited

OTHER PUBLICATIONS

"Auto-Correction of Images of a Participant Eyes in a Virtual Collaboration Session", An IP.com Prior Art Database Technical Disclosure, Authors et. al.: Disclosed Anonymously, IP.com No. IPCOM000226803D, IP.com Electronic Publication: Apr. 22, 2013, pp. 1-17.

"Eye Tracking system using low cost hardware", An IP.com Prior Art Database Technical Disclosure, IP.com No. IPCOM000207323D, IP.com Electronic Publication: May 25, 2011, Copyright: Adobe Systems, Inc.

* cited by examiner

UTILIZING EYE TRACKING TO DETERMINE ATTENDEE ENGAGEMENT

TECHNICAL FIELD OF THE INVENTION

The present invention relates generally to the field of eye tracking, and more particularly to gauging audience reactions by eye tracking.

BACKGROUND

Eye tracking can be described as a process of measuring a person's point of gaze or the motion of their eye(s) relative to the position of their head. An eye tracker is a known device for measuring eye movement and eye positions. Eye trackers are used to measure rotations, or position, of the eye in one of several ways, but generally fall into three categories: (i) measurement of the movement of an object directly attached to the eye, (ii) measurement of electric potentials utilizing electrodes placed around the eyes; and (iii) optical tracking without direct contact to the eye. Optical based eye trackers are recognized as one of the most widely used designs. In this case an optical device, such as a camera, focuses on one or both eyes, and records their movement as the viewer looks at various types of stimulus. A wide variety of disciplines use eye tracking techniques. These disciplines include: (i) cognitive science: (ii) psychology; (iii) medical research; (iv) marketing research; (v) human to computer interaction; (vi) teleconferencing/webinar; and (vii) education.

SUMMARY

According to an aspect of the present invention, there is a method for giving a presentation including a visual display over a communication network. The method includes the following steps (not necessarily in the following order): (i) during a play of the presentation, tracking eye positions of a set of control party(ies); (ii) during a play of the presentation, tracking eye positions of a set of non-control party(ies); (iii) determining a set of divergence value(s) corresponding to divergence between the eye position(s) of the control party(ies) and the non-control party(ies); and (iv) determining a disengagement value corresponding to relative disengagement of the non-control party(ies) based, at least in part on the set of divergence value(s).

According to a further aspect of the present invention, a computer program product is used to give a presentation including a visual display provided over a communication network. The computer program product includes software stored on a software storage device. The software includes: first program instructions programmed to during a play of the presentation, track eye positions of a set of control party(ies); second program instructions programmed to during a play of the presentation, track eye positions of a set of non-control party(ies); third program instructions programmed to determine a set of divergence value(s) corresponding to divergence between the eye position(s) of the control party(ies) and the non-control party(ies); and fourth program instructions programmed to determine a disengagement value corresponding to relative disengagement of the non-control party(ies) based, at least in part of the set of divergence value(s). The software is stored on a software storage device in a manner less transitory than a signal in transit.

According to a further aspect of the present invention, a computer system is used to give a presentation including a visual display provided over a communication network. The computer system includes: a processor(s) set; and a software storage device. The processor set is structured, located, connected and/or programmed to run software stored on the software storage device. The software includes: first program instructions programmed to during a play of the presentation, track eye positions of a set of control party(ies), second program instructions programmed to during a play of the presentation, track eye positions of a set of non-control party(ies), third program instructions programmed to determine a set of divergence value(s) corresponding to divergence between the eye position(s) of the control party(ies) and the non-control party(ies), and fourth program instructions programmed to determine a disengagement value corresponding to relative disengagement of the non-control party(ies) based, at least in part of the set of divergence value(s).

DETAILED DESCRIPTION

Figure 1:
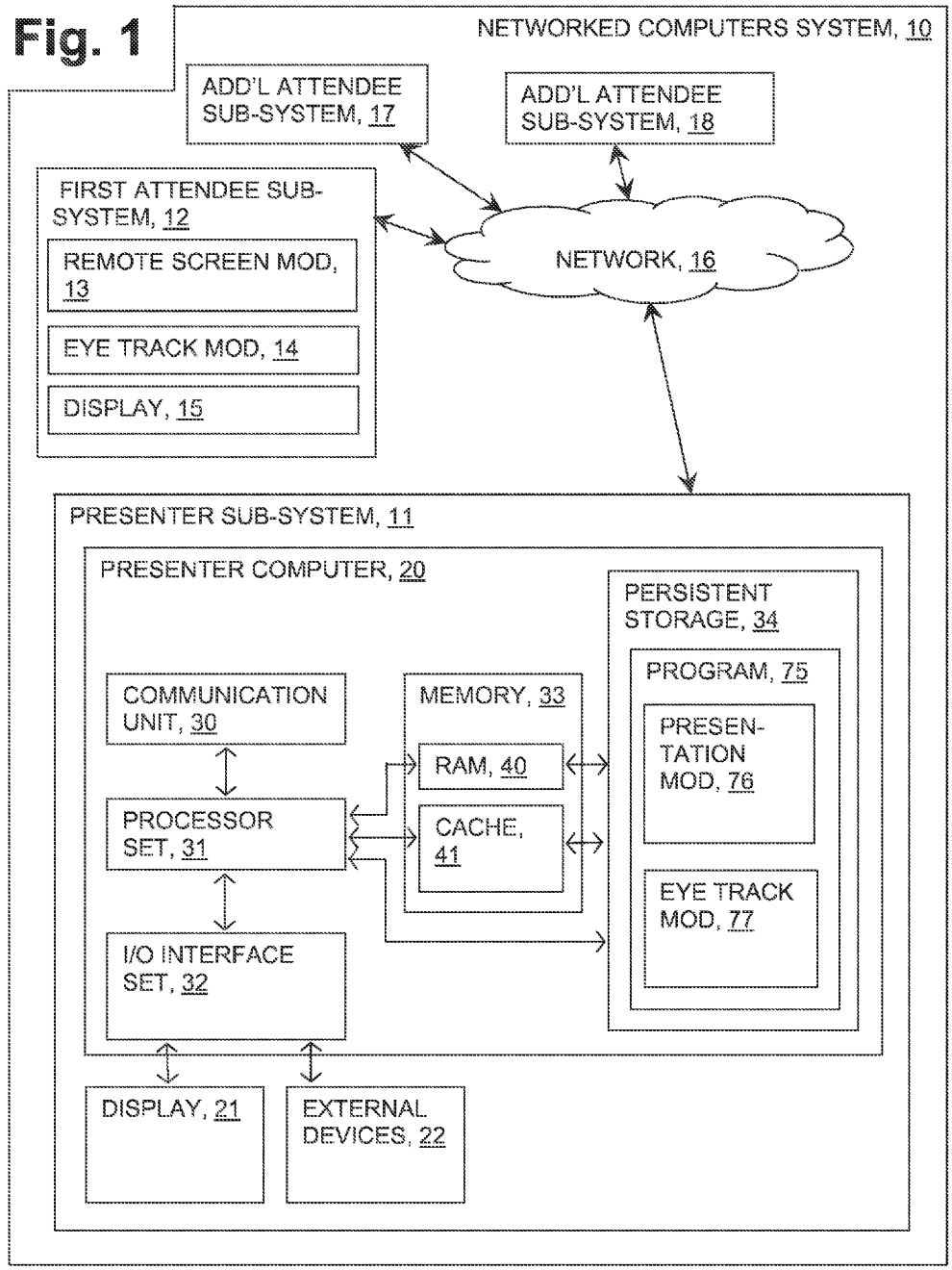
FIG. 1 is a schematic view of a first embodiment of a networked computers system according to the present invention.

Some embodiments of the present invention detect audience (or "attendee") disengagement by determination of deviation value(s) as between parties to the audience presentation. More specifically, this "deviation" refers to deviations in "eye positions" (see definition in Definitions sub-section, below) as between various parties (or groups of parties) to a presentation. In some embodiments, all parties used to determine deviation value(s) (and disengagement value(s) based on the deviation value(s)) will be people simultaneously participating in the presentation. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java (note: the term(s) "Java" may be subject to trademark rights in various jurisdictions throughout the world and are used here only in reference to the products or services properly denominated by the marks to the extent that such trademark rights may exist), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

An embodiment of a possible hardware and software environment for software and/or methods according to the present invention will now be described in detail with reference to the Figures. FIG. 1 is a schematic view illustrating various portions of a networked computers system 10, including: presenter sub-system 11; first attendee sub-system 12; remote screen module 13; eye track module 14; display 15; network 16; additional attendee sub-systems 17 and 18; presenter computer 20; display 21; external devices 22; communication unit 30; processor set 31; input/output (i/o) interface 32; memory device 33; random access memory (RAM) devices 40; cache memory device 41; persistent storage device 34; program 75; presentation module 76; and eye track module 77.

Presenter sub-system 11 is, in many respects, representative of the various computer sub-system(s) in the present invention. Accordingly, several portions of presenter sub-system 11 will now be discussed in the following paragraphs.

Presenter sub-system 11 may be a laptop computer, tablet computer, netbook computer, personal computer (PC), a desktop computer, a personal digital assistant (PDA), a smart phone, or any programmable electronic device capable of communicating with the client sub-systems via network 16. Program 75 is a collection of machine readable instructions and/or data that is used to create, manage and control certain software functions that will be discussed in detail, below, in the Example Embodiment sub-section of this Detailed Description section.

Presenter sub-system 11 is capable of communicating with other computer sub-systems via network 16. Network 16 can be, for example, a local area network (LAN), a wide area network (WAN) such as the Internet, or a combination of the two, and can include wired, wireless, or fiber optic connections. In general, network 16 can be any combination of connections and protocols that will support communications between server and client sub-systems.

Presenter sub-system 11 is shown as a block diagram with many double arrows. These double arrows (no separate reference numerals) represent a communications fabric, which provides communications between various components of presenter sub-system 11. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 33 and persistent storage 34 are computer-readable storage media. In general, memory 33 can include any suitable volatile or non-volatile computer-readable storage media. It is further noted that, now and/or in the near future:

(i) external device(s) 22 may be able to supply, some or all, memory for presenter sub-system 11; and/or (ii) devices external to presenter sub-system 11 may be able to provide memory for presenter sub-system 11.

Program 75 is stored in persistent storage 34 for access and/or execution by one or more of the respective computer processors 31, usually through one or more memories of memory 33. Persistent storage 34: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 34.

Program 75 may include both machine readable and performable instructions and/or substantive data (that is, the type of data stored in a database). In this particular embodiment, persistent storage 34 includes a magnetic hard disk drive. To name some possible variations, persistent storage 34 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 34 may also be removable. For example, a removable hard drive may be used for persistent storage 34. Other examples include optical and magnetic disks, thumb drives, and smart cards that are inserted into a drive for transfer onto another computer-readable storage medium that is also part of persistent storage 34.

Communications unit 30, in these examples, provides for communications with other data processing systems or devices external to presenter sub-system 11. In these examples, communications unit 30 includes one or more network interface cards. Communications unit 30 may provide communications through the use of either or both physical and wireless communications links. Any software modules discussed herein may be downloaded to a persistent storage device (such as persistent storage device 34) through a communications unit (such as communications unit 30).

I/O interface set 32 allows for input and output of data with other devices that may be connected locally in data communication with presenter computer 20. For example, I/O interface set 32 provides a connection to external device set 22. External device set 22 will typically include devices such as a keyboard, keypad, a touch screen, and/or some other suitable input device. External device set 22 can also include portable computer-readable storage media such as, for example, thumb drives, portable optical or magnetic disks, and memory cards. Software and data used to practice embodiments of the present invention, for example, program 75, can be stored on such portable computer-readable storage media. In these embodiments the relevant software may (or may not) be loaded, in whole or in part, onto persistent storage device 34 via I/O interface set 32. I/O interface set 32 also connects in data communication with display device 21.

Display device 21 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

II. Example Embodiment

Preliminary note: The flowchart and block diagrams in the following Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
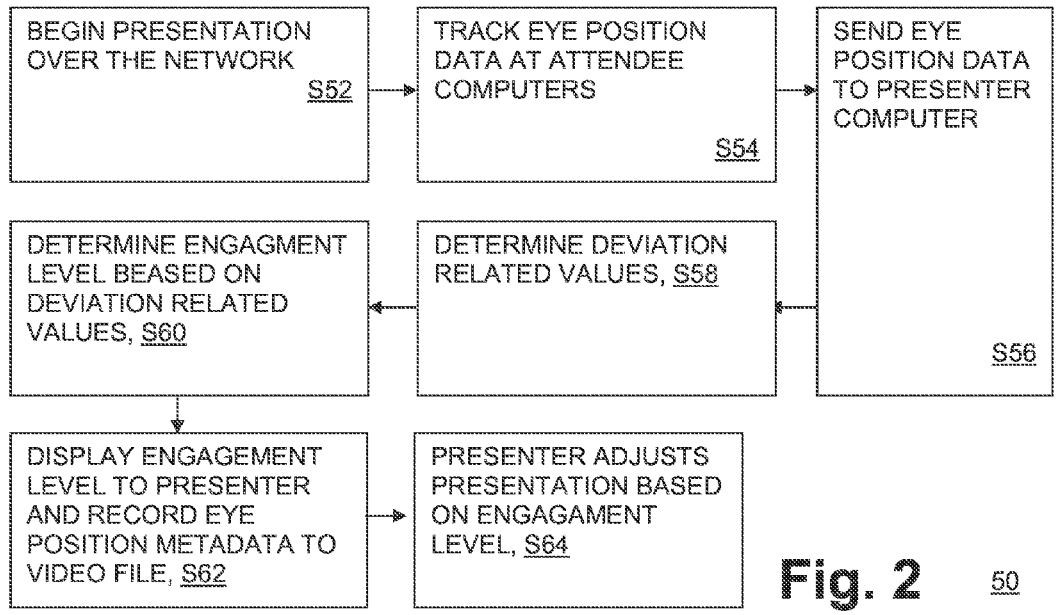
FIG. 2 is a flowchart showing a process performed, at least in part, by the first embodiment system.
Figure 3:
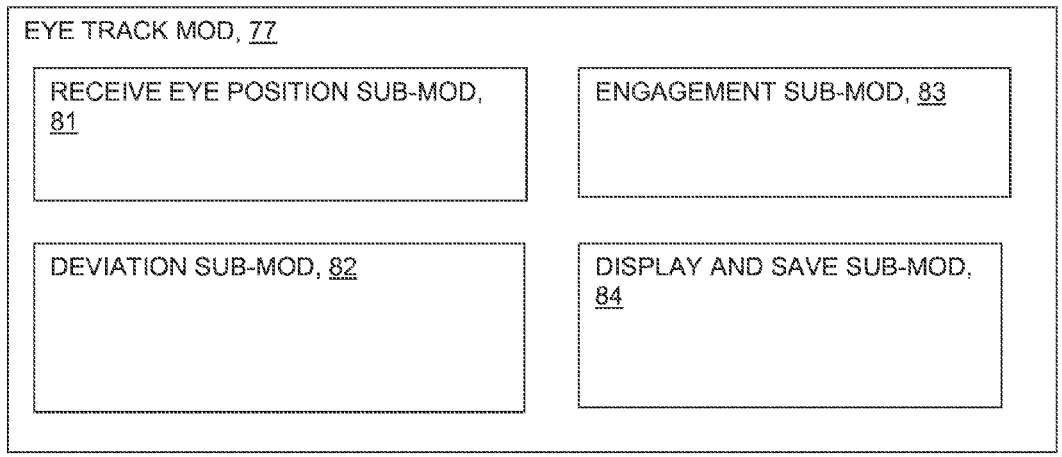
FIG. 3 is a functional block diagram of a software portion of the first embodiment system.

FIG. 2 shows flow chart 50 depicting a method according to the present invention. FIG. 3 shows eye track module (or "mod") 77 for performing at least some of the method steps of flow chart 50. This method of flow chart 50 and associated software of mod 77 will now be discussed, over the course of the following paragraphs, with extensive reference to FIG. 2 (for the method step blocks) and FIG. 3 (for the software blocks).

The method begins at step S52 where a presenter, using presenter sub-system 11, begins a computer-based presentation over network 16 (see FIG. 1). The various attendees of the presentation may be: (i) in the room with the presenter; or (ii) at a remote location from the presenter.

FIG. 1 shows three representative attendees (at attendee sub-systems 12, 17 and 18), but in this example there are actually several hundred attendees. In this example, the presenter is a university professor giving a university lecture on Isaac Newton and his continuing impact on modern television programming. More specifically, as shown in FIG. 1, presentation mod 76 includes software to assemble and distribute a presentation from the presenter's materials including the presenter's speaking audio track, video from various cameras trained on the presenter and (perhaps most importantly for present purposes) a computer based slide show with constituent text, video and pictures, such as selected Isaac Newton quotations and snippets of current television programs that evince Newton's continuing influence. Based on user input from the presenter's assistant, presentation mod 76 controls, at any given moment, what the attendees will: (i) hear through the audio presentation hardware (for example, ear buds) of their respective attendee sub-systems; and (ii) see on the displays of their various visual presentation hardware (for example, laptop displays, smart phone displays, large displays that serve an entire classroom, etc.). More specifically, as shown in FIG. 1, on an ongoing basis over the course of the presentation, presentation mod 76 sends the presentation over network 16, where it is received by the various attendees, such as first attendee sub-system 12 which receives the presentation data through its remote screen mod 13 and displays the visual portion of the presentation on its display 15. The computer based presentation software on the presenter's and attendees sub-systems may be any type of presentation software currently conventional or to be developed in the future.

By the beginning of step S52, the attendees in this example have been split into two groups: (i) a control group; and (ii) a non-control group. In this example, each of the two groups of attendees includes well over 100 individuals. The control group has been selected because, based on past scholastic performance, it is believed that control group members will pay close attention to the visual portion of the presentation whether they find it particularly interesting or not. It is believed that the non-control group attendees will pay attention to the presentation if it is "engaging" (see definition of "engagement," below, in the definitions sub-section), but that the non-control group will tend to stop paying attention if a portion of the presentation is not engaging.

Processing proceeds to step S54 where: (i) eye track mod 14 of first attendee sub-system 12 (see FIG. 1) uses its hardware and software to track the "eye position" (see definition of "eye position," below, in the Definitions sub-section) of the first attendee; and (ii) other eye tracking modules (not separately shown in FIG. 1) tracks the respective, individual eye positions of the other attendees. These eye tracking modules of the attendee sub-systems may be of a type now conventional, or to be developed in the future.

Processing proceeds to step S56 where the eye position data is sent from the various attendee's sub-systems, over network 16 (see FIG. 1), to receive eye position sub-mod 81 of eye track mod 77 of program 75 of presenter computer 20 (see FIGS. 1 and 3). In this example, sub-mod 81 is continuously receiving eye position data for hundreds of attendees in both the control group and the non-control group.

Processing proceeds to step S58, where deviation sub-mod 82 of eye track mod 77 determines the following based an application mathematical algorithms to the received eye position data: (i) an aggregate eye position value of the control group considered as a whole; (ii) an eye position deviation value for each attendee of the control group considered individually; (iii) a spread value for the control group; (iv) an eye position deviation value for each attendee of the non-control group considered individually; (v) a spread value for the non-control group; and (vi) a mean eye position deviation value for the non-control group considered as a whole.

In this example, the aggregate eye position for the control group is calculated similar to the way that a center of mass location is calculated for a group of co-planar point masses. In this example, each control group attendee's eye position is given an equal weight, unless the control group member has closed eyes, is looking away from her display screen or the like (in which case that attendee's eye position data is not used in the aggregate control group eye position location calculation. Because there are hundreds of control group members this will help compensate for momentary inattention by a few control group attendees at any time. As mentioned above, the control group is selected so that they can be counted on, collectively and in the main, to be paying close attention to the presentation.

As mentioned above, deviation values are also calculated for each member of the control group. Each deviation is the distance scalar between the control group's aggregate eye position and the position for a given control group attendee at a given moment in time. In this example, the deviation values for the control group members are used so that a spread value can be calculated for the control group as a whole. In this example, the spread value for the control group is the standard deviation of the distribution of deviation values for the control group attendees. If the control group members are generally looking close to the aggregate eye position, then this spread value will be low. If the control group members are generally looking relatively far away from the aggregate eye position, then this spread value will be high.

In this example, no aggregate eye position is calculated for the non-control group. However, deviation values are calculated for each member of the non-control group. Each deviation is the distance scalar between the control group's aggregate eye position and the position for a given non-control group attendee at a given moment in time. In this example, the deviation values for the non-control group members are used in calculation of: (a) a spread value for the non-control group considered as a whole; and (b) a mean deviation value for the non-control group considered as a whole. In this example, the spread value for the non-control group is the standard deviation of the distribution of deviation values for the non-control group attendees. In this example, the mean deviation value for the non-control group is the average of the deviation values for the non-control group attendees. In this example, the spread and mean values for the non-control group are both based on deviations from the control group aggregate eye position. Alternatively, a non-control group aggregate eye position and/or a global aggregate eye position (including both control group and non-control group members) could be used as a basis for calculating individual attendee deviation values, a spread value and/or a mean deviation value for the non-control group.

Processing proceeds to step S60, where engagement sub-mod 83 of eye track mod 77 determines an engagement level (or decides that the data is inconclusive) based on the deviation related values previously calculated at step S58. In this example, the engagement level is determined based on rules which will be respectively discussed in the following paragraphs.

First Rule: if the spread value for the control group is above a "control group spread threshold value" then the data is considered to be inconclusive. The reasoning behind this rule is that the control group can generally be trusted to be looking at the same eye position within the presenter's presentation. However, if the control group is looking at different positions, then it is assumed that the presentation is at a juncture where the attendees should not be expected to be focused on a common location. For example, the presenter may have told a funny joke and the control group members may be (appropriately) using the moment to momentarily de-focus their eyes and laugh without particularly paying attention to the visual display until the laughter stops.

Second Rule: if the spread values for the non-control group is larger than the spread value for the control group by less than a "spread difference threshold value," then the disengagement rating value is determined to be "low." The reasoning behind this rule is that the relatively low spread in the non-control group is indicative of engagement (that is, low disengagement) on behalf of the non-control group. This Second Rule has the further advantage of normalizing eye position "scatter" against eye position scatter of a control group so that: (i) portions of the presentation which require only relatively lax attention are only expected to achieve relatively lax attention in the non-control group; and (ii) portions of the presentation which require relatively focused attention are expected to receive high attention in the non-control group.

Third Rule: if the spread value for the non-control group is smaller than the spread value for the control group, then the disengagement rating value is determined to be "very low." In this example, the presenter appears to be holding the attention of the non-control group even better than she is holding the attention of the control group. This can help even the struggling students to succeed, and the presenter's employer (an educational institution) considers this to be the hallmark of an excellent presentation. If a presenter achieves "very low" disengagement for a certain proportion of the time then this will be a positive factor on the presenter's annual employment evaluation scorecard.

Fourth Rule: assuming none of the previous three rules apply, then a disengagement value is determined as follows, if the mean deviation value for the non-control group is: (i) greater than a first threshold, then the disengagement rating value is "very high;" (ii) between a first threshold and second threshold, then the disengagement rating value is "high;" (iii) between a second threshold and a third threshold, then the disengagement rating value is "low;" and (iv) less than the third threshold, then the disengagement rating value is "very low." In this example, the first threshold is greater than the second threshold and the second threshold is greater than the third threshold.

The foregoing list of rules is only one example of how eye position deviation values can be turned into engagement/disengagement rating values. Other examples will be discussed, below, in the Further Comments And/Or Embodiments sub-section.

Processing proceeds to step S62, where display and save sub-mod 84 of eye track mod 77: (i) displays the engagement level on the presenter's display device (see FIG. 1) at reference numeral; and (ii) saves the aggregate eye position of the control group as metadata in a video file of the presentation which is being recorded for future use. Because the aggregate eye position of the control group is saved as metadata, this means that disengagement can be measured for future audiences without assigning and monitoring a new control group.

Figure 4A:
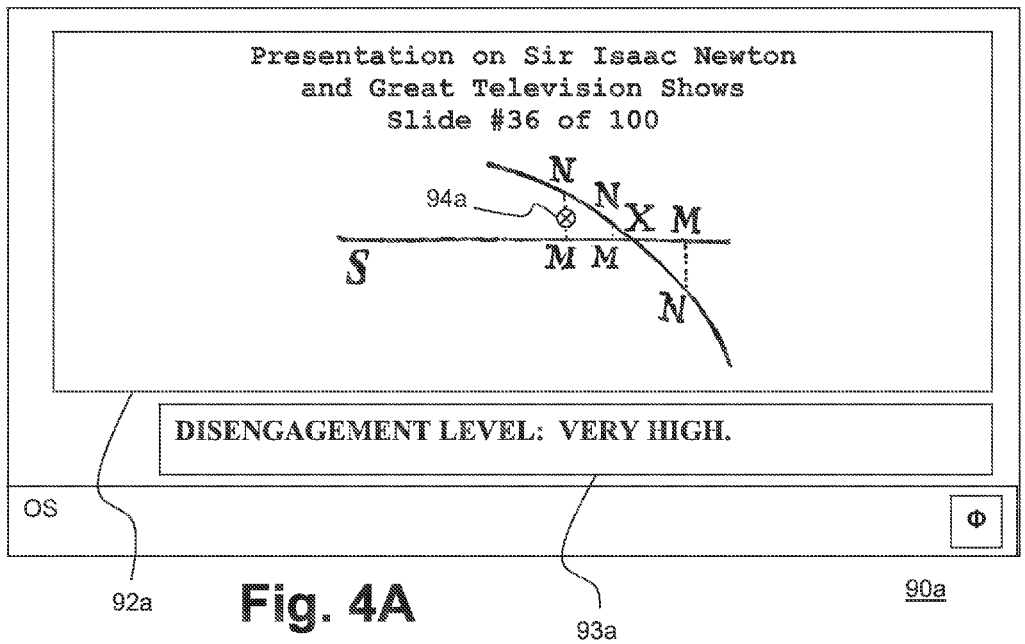
FIG. 4A is a first screenshot generated by the first embodiment computer system.

As shown in FIG. 4A, first presenter's screenshot 90a includes: first presentation window 92a; and first disengagement rating display portion 93a. As mentioned above, the subject matter of the presentation is Isaac Newton's influence on modern television programming. As shown at the first presentation window 92a, the presenter has reached slide number 36 where some rather dry and arcane mathematics are being explained. While some audiences may enjoy this portion of the presentation, the non-control group of the present audience is, generally speaking, looking somewhere other than where the aggregate eye position of the control group (that is, first focus point 94a) is located—so much so that the mean deviation value exceeds the first threshold and the disengagement rating value is "very high." This disengagement rating value is set forth in first disengagement rating display portion 93a of first presenter's screenshot 90a.

Figure 4B:
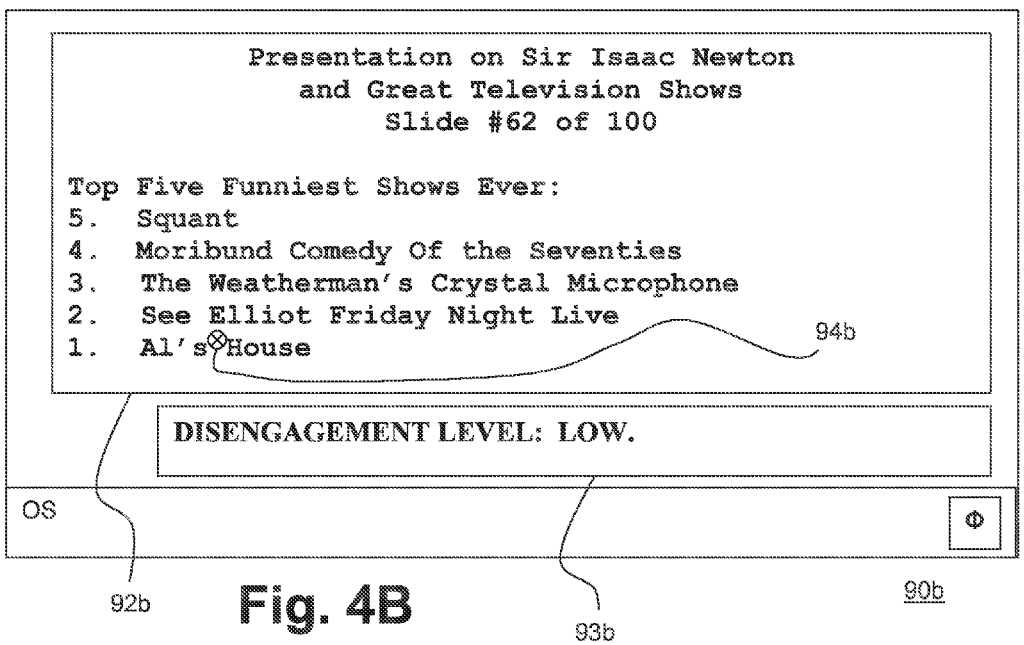
FIG. 4B is a second screenshot generated by the first embodiment computer system.

Processing proceeds to step S64, where the presenter adjusts her presentation to bring down the disengagement rating value. In this example, the presenter skips ahead to slide 62 of the presentation where the five (5) funniest television shows of all time are listed. More specifically, as shown in FIG. 4B, second presenter's screenshot 90b includes: second presentation window 92b; second disengagement rating display portion 93b; and second focal point 94b. Slide 62, and its list of funny shows, is now in second presentation window 92b. The non-control group of the present audience has responded to this shift in the subject matter so that, under the Forth Rule (set forth above), the mean deviation value is between the second and third threshold values, and, accordingly, the disengagement rating value has become "low." This new, updated disengagement rating value is set forth in second disengagement rating display portion 93b of second presenter's screenshot 90b.

III. Further Comments and/or Embodiments

Some embodiments of the present invention may recognize one, or more, of the following potential problems, drawbacks or opportunities for improvement with respect to the state of the art: (i) difficulty to detect and notify a presenter, of a web-based teleconference/webinar, when the attendees are reaching varying levels of disengagement; (ii) difficulty for the presenter of a remote presentation to recognize attendee disengagement because the presenter cannot actually see the attendees the way the presenter can in a live presentation; (iii) difficulty for the presenter to re-engage the attendees without disrupting the session; (iv) difficulty to detect attendee disengagement, through deviations between where the presenter and the attendee are looking; (v) difficulty to detect attendee disengagement when the attendee moves their gaze from the session window to another window, un-related to the session; and/or (vi) audience disengagement can be a problem, for example, when a programmer and code reviewer are on a conference call and the code reviewer stops paying close attention to what the programmer is telling the code reviewer about the code that they are remotely sharing on their respective screens (this can result in bugs in program code).

Some embodiments of the present invention may further include one, or more, of the following features, characteristics and/or advantages: (i) a remote screen sharing system that incorporates eye tracking capabilities for both the presenter and attendees; (ii) a system that detects and notifies the presenter when the attendees are reaching varying levels of disengagement; (iii) enabling the presenter to recognize "disengagement" (see definition, below, in the definitions subsection) without seeing the attendees; (iv) provides a way for the presenter to adjust the presentation style to re-engage attendees without disrupting the session; (v) detecting disengagement through deviations between where the presenter and attendees are looking during a remote screen sharing session; (vi) focus on eye tracking to detect when the user is looking at something other than the remote screen shared window; (vii) detecting if a foreground window was obscuring the remote screen share window via a user mouse click or alt+tab keystroke; and/or (viii) detecting disengagement through detecting a "context switch" (a "context switch" occurs when an attendee, of a remote screen sharing session, is looking at the remote screen share window and the attendee moves her eye position to look at windows other than the window of the remote presentation).

The following steps show operation of an embodiment of the present invention: (i) a programmer calls a code reviewer; (ii) the programmer opens up a screen sharing session with eye tracking capability and invites the code reviewer; (iii) the code reviewer joins the screen sharing session by opening up a web browser and logging into a screen sharing web site that has been set up by the code reviewer; (iv) the code reviewer is asked for permission to enable eye tracking system and grants permission; (v) the system begins tracking the eye position of the programmer relative to the shared code display he is looking at on his system as well as the eye position of the code reviewer relative to the shared code display on his system; (vi) in addition to sharing the display of a code file, the programmer additionally opens up a web browser window which also becomes part of the shared screen display, to review the resulting web application change based on the code being reviewed; (vii) the code reviewer starts off by closely following what the programmer is reviewing as he reviews code (such that the respective eye positions of the programmer and the code reviewer remain approximately the same); (viii) responsive to the approximate match in respective eye positions, the system displays a green light to the programmer; (ix) after a time the code reviewer trails off, looking over at the web browser being shared by the programmer (causing a mismatch in eye positions); (x) responsive to the mismatch in respective eye positions, the system displays a yellow light to programmer; (xi) the programmer notes the yellow light, asks the code reviewer an engaging question to bring the code reviewer back to a state of paying attention to the code, rather than the browser window; (xii) after some more time passes, the code reviewer trails off again, looking at a chat message on his local system (and, again causing a mismatch in respective eye positions); (xiii) responsive to this repeated lapse of eye position matching, the system displays an orange light to programmer; (xiv) the programmer notes the orange light and asks the code reviewer if there would be a better time to meet; (xv) the code reviewer says yes, and they reschedule a time when the code reviewer can be fully engaged; (xvi) the programmer and code reviewer meet up later and the code reviewer remains engaged the entire time (such that respective eye positions match closely for the second shared session); and (xvii) the programmer ends up with clean code because the code reviewer helped him find and address numerous issues due to the code reviewer's high level of engagement.

Some embodiments of the present invention may include one, or more, of the following features, characteristics and/or advantages: (i) the eye tracking system can tell when a party's eyes are closed; (ii) the eye tracking system can tell when a party has left the vicinity of the shared session; and (iii) some disengagement determining algorithms according to the present invention can appropriately account for phenomena such as brief eye closures, brief periods of leaving the vicinity of the presentation display screen, brief periods of looking away, and the like.

Some embodiments of the present invention may include one, or more, of the following features, characteristics and/or advantages: (i) presentation of an indicator (for example, a green indicator) to the presenter when the eyes of the presenter, and the eyes of the attendee, are in the same area; (ii) presentation of an indicator (for example, a yellow indicator) to the presenter when the eyes of the attendee are not in same area as the presenters eyes, but are still within the screen share boundaries; (iii) presentation of an indicator (for example, an orange indicator) to the presenter when the eyes of the attendee are off the screen share boundaries, but the eyes of the attendee are still detected looking at something else (such as their local system screen); (iv) presentation of an indicator (for example, a red indicator) to the presenter, when the eyes of the attendee are closed for an extended period of time (such as falling asleep); and/or (v) presentation of an indicator (for example a black indicator) to the presenter when the eyes of the attendee are undetectable (such as when an attendee has walked away, turned around, etc.)

Some embodiments of the present invention may further include one, or more, of the following features, characteristics and/or advantages: (i) implementation is inexpensive (such as using web cams where the camera resolution is sufficient to detect eye direction); (ii) no bandwidth is needed for the attendee to send a video stream to the presenter; (iii) analysis by the software would occur on the client side, sending back a simple notification to the presenter; and/or (iv) implementation would be non-intrusive, because the presenter can't see the attendee; (v) application to e-Learning (so a teacher knows when their students aren't engaged and can make adjustments to their teaching style); (vi) application to webcasts (so a presenter can adjust their presentation style depending on engagement); and (vii) application to team working sessions (so a team leader knows when their team isn't engaged and can adjust their facilitation style).

Some embodiments of the present invention may further include one, or more, of the following features, characteristics and/or advantages: (i) presenter can use a laser pointer instead of their eyes; (ii) presenter could record their eye movements in advance of the presentation; (iii) the software can determine which desktop window the attendee is looking at by using the attendee's web cam and eye tracking software; (iv) presenter can appoint a viewer, whom they trust, to pay attention and to stand in for the presenters eye movements; (v) attendee disengagement can be detected by how convergent or how divergent the respective eye positions of the various attendees are by using the aggregate attendee eye positions and/or; (vi) use location where the majority of the attendees are focused as the desired focus location (in addition, or as an alternative, to presenter eye tracking).

Further with regard to item (ii) in the above paragraph, the presenters' eye movements can be recorded in advance by utilizing a system that records both the presenters' voice and eye movements together, then dictates them so they could be referenced during the actual presentation. During the actual presentation, the playback system would listen to what was being said live and line up the dictation, in the recorded presentation, so eye tracking would be in sync.

Some embodiments of the present invention may further include one, or more, of the following features, characteristics and/or advantages: (i) may be applied between a programmer and a code reviewer; (ii) may be applied to lectures with students; (iii) may be applied to webcast presentations with an audience; (iv) may be applied to other situations where someone is presenting something to an audience with multiple people; (v) application to any remote style meeting(s); (vi) application to "in person" and "same room" meetings if everyone in the audience is wearing an eye tracking apparatus that could track what they were looking at and report this information to the presenter; (vii) the indicator(s) to the presenter include, but are not limited to, colored lights, text, audible sounds, vibration or any other common mechanism that is used for notification; (viii) the algorithm can be designed to be forgiving enough to allow the presenter to perform periodic glances away from the target area to examine any visual disengagement indicator(s), but if the gaze remains outside of the target area for an extended period of time (for example, one (1) second), this would result in disengagement; and/or (ix) in the event a presenter is not physically in front of a computer screen or camera while performing her presentation, a pointer solution would be put in place, where someone else was pointing where the attendee's should be focusing their attention by using an external pointing tool, such as a laser pointer, mouse pointer, etc.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (ii) in a single proximity within a larger piece of software code; (iii) located within a single piece of software code; (iv) located in a single storage device, memory or medium; (v) mechanically connected; (vi) electrically connected; and/or (vii) connected in data communication.

Software storage device: any device (or set of devices) capable of storing computer code in a manner less transient than a signal in transit.

Tangible medium software storage device: any software storage device (see Definition, above) that stores the computer code in and/or on a tangible medium.

Non-transitory software storage device: any software storage device (see Definition, above) that stores the computer code in a non-transitory manner.

Computer: any device with significant data processing and/or machine readable instruction reading capabilities including, but not limited to: desktop computers, mainframe computers, laptop computers, field-programmable gate array (fpga) based devices, smart phones, personal digital assistants (PDAs), body-mounted or inserted computers, embedded device style computers, application-specific integrated circuit (ASIC) based devices.

Eye position: the position (or range of positions) in space where a set of human eye(s) is focused; eye position generally has a focus (or distance from the eye(s)) component and a positional (for example, up, down left, right) component within a given focal plane; in some embodiments, the focus component may be absent, or of reduced importance; the idea with eye position is to get at least a rough idea of where an individual, or set of individuals, is looking; the "eye position of a group will generally involve some type of averaging (for example, weighted averaging), or blending, the various eye positions of group members to derive an eye position for the group.

Disengagement: not paying attention; in some embodiments of the present invention, eye position deviation, from some expected eye position, serves as a proxy for estimating "disengagement"; this is true despite the fact that it is generally possible for an individual human to be at the same time: (i) paying close attention, and (ii) not looking at anything in particular (for example, visual contents of a presentation may be mapped inside an individual person's human memory, while the individual contemplates the audio portion of the same presentation); it is understood by the inventors, and should be understood by readers, that eye position is only an imperfect proxy for actual "disengagement;" some aspects of the present invention may involve techniques that make eye position serve as a more accurate proxy for actual "disengagement" despite the fact that a single individual's momentary eye position is generally a rather imperfect proxy for actual "disengagement."

Control party/non-control party: a "party" may include one or more individual people.

What is claimed is:

1. A method for giving a presentation including a visual display provided over a communication network, the method comprising:
   during a play of the presentation, tracking eye positions of a control party;
   during a play of the presentation, tracking eye positions of a non-control party;
   determining a divergence value corresponding to divergence between the eye position(s) of the control party and the non-control party; and
   determining a disengagement value corresponding to relative disengagement of the non-control party based, at least in part on the divergence value;
   wherein:
   the control party is made up of a presenter of the presentation;
   the non-control-party is made up of a single attendee of the presentation; and
   the tracking of the set of control party eye positions and the tracking of non-control party eye positions both take place as the presentation is being given by the presenter; and
   presenting the disengagement value to the presenter;
   wherein the presentation of the disengagement value to the presenter includes, appropriate, indications of the following situations: (i) the respective eye positions of presenter and attendee are in the same area; (ii) the respective eye positions of the presenter and attendee are not in the same area but are still in the boundaries of a shared display area; (iii) the eye position of the attendee is outside of the shared display area but still in some proximity to the shared display area; (iv) the eyes of the attendee are closed for an extended period of time; and (v) the attendee is out of scope of eye tracking hardware that tracks the eye position of the attendee.

2. A computer program product for giving a presentation including a visual display provided over a communication network, the computer program product comprising software computer-readable storage medium having software stored thereon, the software comprising:
   first program instructions programmed to during a play of the presentation, track eye positions of a control party;
   second program instructions programmed to during a play of the presentation, track eye positions of a non-control party;
   third program instructions programmed to determine a divergence value corresponding to divergence between the eye positions of the control party and the non-control party; and
   fourth program instructions programmed to determine a disengagement value corresponding to relative disengagement of the non-control party based, at least in part, on the divergence value;
   wherein:
   the control party is made up of a presenter of the presentation;
   the non-control party is made up of a single attendee of the presentation; and
   the first and second program instructions are further programmed to perform tracking of eye positions as the presentation is being given by the presenter;
   wherein:
   the software further comprises fifth program instructions are further programmed to present the disengagement value to the presenter; and
   the presentation of the disengagement value to the presenter includes, appropriate, indications of the following situations: (i) the respective eye positions of presenter and attendee are in the same area; (ii) the respective eye positions of the presenter and attendee are not in the same area but are still in the boundaries of a shared display area; (iii) the eye position of the attendee is outside of the shared display area but still in some proximity to the shared display area; (iv) the eyes of the attendee are closed for an extended period of time; and (v) the attendee is out of scope of eye tracking hardware that tracks the eye position of the attendee;

the software is stored on a non-transitory computer-readable storage medium.

3. A computer system for giving a presentation including a visual display provided over a communication network, the computer system comprising:

a processor set; and a software storage device;

wherein:

the processor set is structured, located, connected and/or programmed to run software stored on the software storage device; and the software comprises:

first program instructions programmed to during a play of the presentation, track eye positions of a control party, second program instructions programmed to during a play of the presentation, track eye positions of a non-control party, third program instructions programmed to determine a divergence value corresponding to divergence between the eye positions of the control party and the non-control party, and fourth program instructions programmed to determine a disengagement value corresponding to relative disengagement of the non-control party based, at least in part on the divergence value, wherein:

the control party is made up of a presenter of the presentation, the non-control party is made up of a single attendee of the presentation, and the first and second program instructions are further programmed to perform tracking of eye positions as the presentation is being given by the presenter wherein:

the software further comprises fifth program instructions are further programmed to present the disengagement value to the presenter, and the presentation of the disengagement value to the presenter includes, appropriate, indications of the following situations: (i) the respective eye positions of presenter and attendee are in the same area; (ii) the respective eye positions of the presenter and attendee are not in the same area but are still in the boundaries of a shared display area; (iii) the eye position of the attendee is outside of the shared display area but still in some proximity to the shared display area; (iv) the eyes of the attendee are closed for an extended period of time; and (v) the attendee is out of scope of eye tracking hardware that tracks the eye position of the attendee.

* * * * *